(12) United States Patent
Christensen (10) Patent No.: US 9,398,152 B2
(45) Date of Patent: Jul. 19, 2016

(54) USING BUSINESS RULES FOR DETERMINING PRESENCE

(75) Inventor: Tore L. Christensen, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1842 days.

(21) Appl. No.: 10/787,922

(22) Filed: Feb. 25, 2004

(65) Prior Publication Data

US 2005/0187781 A1    Aug. 25, 2005

(51) Int. Cl.
| | |
|---|---|
| G06F 15/16 | (2006.01) |
| H04L 12/66 | (2006.01) |
| G06F 3/00 | (2006.01) |
| G06F 21/00 | (2013.01) |
| H04M 3/51 | (2006.01) |
| H04L 12/58 | (2006.01) |

(52) U.S. Cl.
CPC ............ H04M 3/5191 (2013.01); H04L 12/581 (2013.01); H04L 51/04 (2013.01); H04M 3/5141 (2013.01)

(58) Field of Classification Search
CPC ....... H04L 12/581; H04L 51/04; H04L 51/24; H04L 67/24; G06Q 30/0281
USPC .......................................................... 709/207
See application file for complete search history.

(56) References Cited

U.S. PATENT DOCUMENTS

| | | |
|---|---|---|
| 4,817,130 A | 3/1989 | Frimmel, Jr. |
| 4,941,168 A | 7/1990 | Kelly, Jr. |
| 5,001,710 A | 3/1991 | Gawrys et al. |
| 5,003,577 A | 3/1991 | Ertz et al. |
| 5,007,076 A | 4/1991 | Blakley |
| 5,153,905 A | 10/1992 | Bergeron et al. |
| 5,185,782 A | 2/1993 | Srinivasan |
| 5,313,515 A | 5/1994 | Allen et al. |
| 5,329,578 A | 7/1994 | Brennan et al. |

(Continued)

FOREIGN PATENT DOCUMENTS

| | | |
|---|---|---|
| EP | 0 886 416 | 12/1998 |
| EP | 0930592 | 7/1999 |

(Continued)

OTHER PUBLICATIONS

"Instant Messaging: How secure it is?" by Susan Willner, GSEC Practical V1.2e, 2001, SANS Institute, URL at: http//www.sans.org/reading_room/whitepapers/threats/instant-messaging-secure-it_464.*

(Continued)

*Primary Examiner* — Phuoc Nguyen
*Assistant Examiner* — Kishin G Belani
(74) *Attorney, Agent, or Firm* — Sheridan Ross P.C.

(57) ABSTRACT

The present invention provides various contact center embodiments for interacting with customers using instant messaging. In one embodiment, the contact center is configured to receive instant message notifications from a customer when the customer is available for contact by instant messaging. In another embodiment, the contact center is configured to route sessionless instant messages only to a selected agent for a specified period of time. In another embodiment, the contact center is configured to provide to customers presence information for administered instant message addresses before the customers contact the contact center. In another embodiment, the contact center is configured to perform an outbound instant messaging campaign or alert with customers.

7 Claims, 4 Drawing Sheets

(56) References Cited

U.S. PATENT DOCUMENTS

| | | |
|---|---|---|
| 5,341,414 A | 8/1994 | Popke |
| 5,371,534 A | 12/1994 | Dagdeviren et al. |
| 5,410,343 A | 4/1995 | Coddington et al. |
| 5,430,792 A | 7/1995 | Jesurum et al. |
| 5,434,908 A | 7/1995 | Klein |
| 5,493,692 A | 2/1996 | Theimer et al. |
| 5,511,112 A | 4/1996 | Szlam |
| 5,555,376 A | 9/1996 | Theimer et al. |
| 5,590,178 A | 12/1996 | Murakami et al. |
| 5,706,329 A | 1/1998 | Foladare et al. |
| 5,712,902 A | 1/1998 | Florence et al. |
| 5,742,763 A | 4/1998 | Jones |
| 5,802,510 A | 9/1998 | Jones |
| 5,805,587 A | 9/1998 | Norris et al. |
| 5,819,084 A | 10/1998 | Shapiro et al. |
| 5,826,039 A | 10/1998 | Jones |
| 5,864,874 A | 1/1999 | Shapiro |
| 5,894,504 A | 4/1999 | Alfred et al. |
| 5,903,726 A | 5/1999 | Donovan et al. |
| 5,999,611 A | 12/1999 | Tatchell et al. |
| 6,018,655 A | 1/2000 | Bartle et al. |
| 6,031,896 A | 2/2000 | Gardell et al. |
| 6,038,296 A | 3/2000 | Brunson et al. |
| 6,046,762 A | 4/2000 | Sonesh et al. ............ 348/16 |
| 6,068,188 A | 5/2000 | Knowles |
| 6,088,441 A | 7/2000 | Flockhart et al. |
| 6,094,681 A | 7/2000 | Shaffer et al. |
| 6,128,304 A | 10/2000 | Gardell et al. |
| 6,130,937 A | 10/2000 | Fotta |
| 6,144,644 A | 11/2000 | Bajzath et al. |
| 6,154,738 A | 11/2000 | Call |
| 6,167,266 A | 12/2000 | Havinis et al. |
| 6,169,795 B1 | 1/2001 | Dunn et al. |
| 6,185,603 B1 | 2/2001 | Henderson et al. |
| 6,188,756 B1 | 2/2001 | Mashinsky |
| 6,199,048 B1 | 3/2001 | Hudetz et al. |
| 6,208,870 B1 | 3/2001 | Lorello et al. |
| 6,212,265 B1 | 4/2001 | Duphorne |
| 6,215,784 B1 | 4/2001 | Petras et al. |
| 6,226,360 B1 | 5/2001 | Goldberg et al. |
| 6,272,319 B1 | 8/2001 | Narusawa |
| 6,298,062 B1 | 10/2001 | Gardell et al. |
| 6,301,609 B1 | 10/2001 | Aravamudan et al. |
| 6,307,931 B1 | 10/2001 | Vaudreuil |
| 6,310,947 B1 | 10/2001 | Polcyn |
| 6,311,231 B1 | 10/2001 | Bateman et al. |
| 6,317,593 B1 | 11/2001 | Vossler |
| 6,330,243 B1 | 12/2001 | Strandberg |
| 6,330,317 B1 | 12/2001 | Garfinkel |
| 6,332,081 B1 | 12/2001 | Do |
| 6,360,222 B1 | 3/2002 | Quinn |
| 6,408,177 B1 | 6/2002 | Parikh et al. |
| 6,411,682 B1 | 6/2002 | Fuller et al. |
| 6,430,271 B1 | 8/2002 | DeJesus et al. |
| 6,430,602 B1 | 8/2002 | Kay et al. ............ 709/206 |
| 6,430,604 B1 | 8/2002 | Ogle et al. |
| 6,449,260 B1 | 9/2002 | Sassin et al. |
| 6,456,711 B1 | 9/2002 | Cheung et al. |
| 6,463,299 B1 | 10/2002 | Macor |
| 6,463,471 B1 | 10/2002 | Dreke et al. |
| 6,477,105 B2 | 11/2002 | Aritomi et al. |
| 6,477,373 B1 | 11/2002 | Rappaport et al. |
| 6,477,374 B1 | 11/2002 | Shaffer et al. |
| 6,480,484 B2 | 11/2002 | Morton |
| 6,535,600 B1 | 3/2003 | Fisher et al. |
| 6,546,097 B1 | 4/2003 | Peltz |
| 6,549,612 B2 | 4/2003 | Gifford et al. |
| 6,560,318 B1 | 5/2003 | Spielman et al. |
| 6,561,805 B2 | 5/2003 | Kumar |
| 6,587,681 B1 | 7/2003 | Sawai |
| 6,614,783 B1 | 9/2003 | Sonesh et al. ............ 370/352 |
| 6,636,587 B1 | 10/2003 | Nagai et al. |
| 6,643,360 B1 | 11/2003 | Reine |
| 6,658,095 B1 | 12/2003 | Yoakum et al. |
| 6,665,534 B1 | 12/2003 | Conklin et al. |
| 6,668,167 B2 | 12/2003 | McDowell et al. |
| 6,675,168 B2 | 1/2004 | Shapiro et al. |
| 6,700,967 B2 | 3/2004 | Kleinoder et al. |
| 6,707,890 B1 | 3/2004 | Gao et al. |
| 6,738,462 B1 | 5/2004 | Brunson |
| 6,741,586 B1 | 5/2004 | Schuster et al. |
| 6,750,897 B1 | 6/2004 | Moshrefi et al. |
| 6,751,453 B2 | 6/2004 | Schemers et al. |
| 6,751,459 B1 | 6/2004 | Lee et al. |
| 6,788,773 B1 | 9/2004 | Fotta |
| 6,789,120 B1 | 9/2004 | Lee et al. |
| 6,795,429 B1 | 9/2004 | Schuster et al. |
| 6,807,423 B1 | 10/2004 | Armstrong et al. |
| 6,839,735 B2 | 1/2005 | Wong et al. |
| 6,865,384 B2 | 3/2005 | Sagi et al. |
| 6,868,140 B2 | 3/2005 | Myers et al. |
| 6,868,395 B1* | 3/2005 | Szlam et al. ............ 705/27 |
| 6,871,062 B2 | 3/2005 | Trop et al. |
| 6,879,677 B2 | 4/2005 | Trandal et al. |
| 6,879,828 B2 | 4/2005 | Virtanen et al. |
| 6,888,927 B1 | 5/2005 | Cruickshank et al. |
| 6,891,933 B2 | 5/2005 | Kumamoto |
| 6,891,934 B1 | 5/2005 | Gao et al. |
| 6,925,166 B1 | 8/2005 | Chan |
| 6,937,597 B1 | 8/2005 | Rosenberg et al. |
| 6,968,052 B2 | 11/2005 | Wullert, II |
| 6,968,179 B1 | 11/2005 | De Vries |
| 6,987,765 B2 | 1/2006 | March et al. |
| 6,999,731 B2 | 2/2006 | Cronin |
| 7,003,087 B2 | 2/2006 | Spencer et al. |
| 7,020,480 B2 | 3/2006 | Coskun et al. |
| 7,023,971 B1 | 4/2006 | Huart et al. |
| 7,023,980 B2 | 4/2006 | Lenard |
| 7,035,385 B2 | 4/2006 | Levine et al. |
| 7,039,040 B1 | 5/2006 | Burg |
| 7,054,939 B2 | 5/2006 | Koch et al. |
| 7,058,036 B1 | 6/2006 | Yu et al. |
| 7,068,762 B2 | 6/2006 | Skladman et al. |
| 7,074,853 B2 | 7/2006 | Smith et al. |
| 7,080,321 B2* | 7/2006 | Aleksander et al. ............ 715/708 |
| 7,092,370 B2 | 8/2006 | Jiang et al. |
| 7,099,867 B2 | 8/2006 | Okada et al. |
| 7,103,155 B2 | 9/2006 | Caharel et al. |
| 7,123,647 B1 | 10/2006 | Sheng |
| 7,123,697 B2 | 10/2006 | Amir et al. |
| 7,130,390 B2 | 10/2006 | Abburi |
| 7,158,630 B2 | 1/2007 | Fotta et al. |
| 7,171,473 B1 | 1/2007 | Eftis et al. |
| 7,192,235 B2 | 3/2007 | Blight et al. |
| 7,218,626 B2 | 5/2007 | Shaheen et al. |
| 7,245,713 B1 | 7/2007 | Simpson et al. |
| 7,269,162 B1* | 9/2007 | Turner ............ 370/352 |
| 7,269,247 B2 | 9/2007 | Mashinsky |
| 7,283,808 B2 | 10/2007 | Castell et al. |
| 7,287,056 B2 | 10/2007 | Loveland et al. |
| 7,313,617 B2 | 12/2007 | Malik et al. |
| 7,340,246 B1 | 3/2008 | Kanerva et al. |
| 7,356,137 B1 | 4/2008 | Burg et al. |
| 7,359,496 B2 | 4/2008 | Qian et al. |
| 7,398,061 B2 | 7/2008 | Mousseau |
| 7,436,939 B1 | 10/2008 | Packingham et al. |
| 7,436,945 B2 | 10/2008 | Agrawal et al. |
| 7,437,162 B1 | 10/2008 | Zhang et al. |
| 7,487,095 B2* | 2/2009 | Hill et al. ............ 704/275 |
| 7,492,872 B1 | 2/2009 | Di Carlo et al. |
| 7,542,558 B2 | 6/2009 | Klein et al. |
| 7,602,895 B2 | 10/2009 | Terry et al. |
| 7,609,663 B2 | 10/2009 | Neuhaus et al. |
| 2001/0006893 A1 | 7/2001 | Yoshioka |
| 2001/0012286 A1 | 8/2001 | Huna et al. |
| 2001/0029176 A1 | 10/2001 | Taniguchi |
| 2002/0019829 A1 | 2/2002 | Shapiro |
| 2002/0021307 A1 | 2/2002 | Glenn et al. |
| 2002/0024958 A1 | 2/2002 | Iveland et al. |
| 2002/0032040 A1 | 3/2002 | Tsukamoto |
| 2002/0035605 A1* | 3/2002 | McDowell et al. ............ 709/206 |
| 2002/0052225 A1 | 5/2002 | Davis et al. |
| 2002/0055350 A1 | 5/2002 | Gupte et al. |
| 2002/0055975 A1* | 5/2002 | Petrovykh ............ 709/205 |

(56) References Cited

U.S. PATENT DOCUMENTS

| | | |
|---|---|---|
| 2002/0065894 A1 | 5/2002 | Dalai et al. |
| 2002/0069081 A1* | 6/2002 | Ingram et al. ............... 705/1 |
| 2002/0073208 A1* | 6/2002 | Wilcock et al. ............ 709/227 |
| 2002/0076010 A1 | 6/2002 | Sahel |
| 2002/0076025 A1 | 6/2002 | Liversidge et al. |
| 2002/0082931 A1 | 6/2002 | Siegel et al. |
| 2002/0083127 A1 | 6/2002 | Agrawal |
| 2002/0085701 A1 | 7/2002 | Parsons et al. |
| 2002/0087630 A1 | 7/2002 | Wu |
| 2002/0098831 A1 | 7/2002 | Castell et al. |
| 2002/0116336 A1 | 8/2002 | Diacakis et al. |
| 2002/0116461 A1 | 8/2002 | Diacakis et al. |
| 2002/0120687 A1 | 8/2002 | Diacakis et al. |
| 2002/0126701 A1 | 9/2002 | Requena |
| 2002/0131395 A1 | 9/2002 | Wang |
| 2002/0160757 A1 | 10/2002 | Shavit et al. |
| 2002/0176558 A1 | 11/2002 | Tate et al. |
| 2003/0014491 A1 | 1/2003 | Hovitz et al. |
| 2003/0018720 A1 | 1/2003 | Chang et al. |
| 2003/0026289 A1 | 2/2003 | Mukherjee et al. |
| 2003/0028597 A1 | 2/2003 | Salmi et al. |
| 2003/0028621 A1 | 2/2003 | Furlong et al. |
| 2003/0037103 A1 | 2/2003 | Salmi et al. |
| 2003/0041101 A1 | 2/2003 | Hansche et al. |
| 2003/0065788 A1 | 4/2003 | Salomaki |
| 2003/0073440 A1 | 4/2003 | Mukherjee et al. |
| 2003/0086390 A1 | 5/2003 | Eschbach et al. |
| 2003/0110228 A1* | 6/2003 | Xu et al. ............... 709/207 |
| 2003/0110292 A1 | 6/2003 | Takeda et al. |
| 2003/0112952 A1 | 6/2003 | Brown et al. |
| 2003/0115332 A1 | 6/2003 | Honeisen |
| 2003/0130864 A1* | 7/2003 | Ho et al. ............... 705/1 |
| 2003/0135569 A1 | 7/2003 | Khakoo et al. |
| 2003/0148756 A1 | 8/2003 | Onishi et al. |
| 2003/0154251 A1 | 8/2003 | Manabe et al. |
| 2003/0154293 A1 | 8/2003 | Zmolek |
| 2003/0191762 A1 | 10/2003 | Kalliokulju et al. |
| 2003/0195811 A1* | 10/2003 | Hayes et al. ............... 705/26 |
| 2003/0217142 A1 | 11/2003 | Bobde et al. |
| 2003/0233415 A1 | 12/2003 | Beyda |
| 2004/0010431 A1* | 1/2004 | Thomas et al. ............... 705/7 |
| 2004/0062383 A1 | 4/2004 | Sylvain |
| 2004/0078445 A1* | 4/2004 | Malik ............... 709/206 |
| 2004/0086094 A1 | 5/2004 | Bosik et al. |
| 2004/0120498 A1 | 6/2004 | Sylvain |
| 2004/0133641 A1 | 7/2004 | McKinnon et al. |
| 2004/0136505 A1 | 7/2004 | Garg et al. |
| 2004/0141594 A1 | 7/2004 | Brunson |
| 2004/0156493 A1 | 8/2004 | Cohen |
| 2004/0189698 A1* | 9/2004 | Bokish ............... 345/751 |
| 2004/0198427 A1 | 10/2004 | Kimbell et al. |
| 2005/0025295 A1 | 2/2005 | Christie |
| 2005/0031107 A1 | 2/2005 | Fotta |
| 2005/0054361 A1 | 3/2005 | Turcanu et al. |
| 2005/0071642 A1* | 3/2005 | Moghe et al. ............... 713/182 |
| 2005/0114159 A1 | 5/2005 | Ozugur et al. |
| 2005/0135595 A1* | 6/2005 | Bushey et al. ........... 379/265.01 |
| 2005/0147086 A1 | 7/2005 | Rosenberg et al. |
| 2005/0163104 A1 | 7/2005 | Christensen et al. |
| 2005/0165894 A1 | 7/2005 | Rosenberg et al. |
| 2005/0165934 A1 | 7/2005 | Rosenberg et al. |
| 2005/0169446 A1* | 8/2005 | Randall et al. ............. 379/93.23 |
| 2005/0198299 A1 | 9/2005 | Beck et al. |
| 2005/0207361 A1 | 9/2005 | Rosenberg et al. |
| 2005/0210104 A1 | 9/2005 | Torvinen |
| 2005/0216565 A1 | 9/2005 | Ito et al. |
| 2005/0216848 A1 | 9/2005 | Thompson et al. |
| 2005/0221807 A1 | 10/2005 | Karlsson et al. |
| 2005/0226403 A1 | 10/2005 | Lenard |
| 2005/0233776 A1 | 10/2005 | Allen et al. |
| 2005/0267895 A1 | 12/2005 | Yoshiuchi et al. |
| 2005/0276407 A1 | 12/2005 | Mohler |
| 2006/0013233 A1 | 1/2006 | Trossen et al. |
| 2006/0167998 A1 | 7/2006 | Yoshiuchi et al. |
| 2006/0248184 A1 | 11/2006 | Wu et al. |
| 2006/0252444 A1 | 11/2006 | Ozugur |
| 2007/0067443 A1 | 3/2007 | Seligmann et al. |
| 2007/0087731 A1 | 4/2007 | Karlsson et al. |
| 2007/0106756 A1 | 5/2007 | Eftis et al. |
| 2007/0112965 A1 | 5/2007 | Eftis et al. |
| 2007/0112966 A1 | 5/2007 | Eftis et al. |
| 2007/0274466 A1 | 11/2007 | Tidwell et al. |
| 2008/0019300 A1 | 1/2008 | Perzy et al. |
| 2008/0040441 A1 | 2/2008 | Maes |
| 2008/0089488 A1 | 4/2008 | Brunson et al. |
| 2009/0022286 A1 | 1/2009 | Brunson et al. |
| 2009/0022287 A1 | 1/2009 | Brunson et al. |
| 2009/0022288 A1 | 1/2009 | Brunson et al. |
| 2009/0022289 A1 | 1/2009 | Brunson et al. |
| 2009/0024601 A1 | 1/2009 | Zmolek |
| 2009/0028303 A1 | 1/2009 | Brunson et al. |
| 2009/0034700 A1 | 2/2009 | Brunson et al. |

FOREIGN PATENT DOCUMENTS

| | | |
|---|---|---|
| EP | 1206106 | 5/2002 |
| EP | 1259053 | 11/2002 |
| EP | 1261179 | 11/2002 |
| JP | 05-260188 | 10/1993 |
| JP | H8-23577 | 1/1996 |
| JP | 9-200813 | 7/1997 |
| JP | H11-046377 | 2/1999 |
| JP | 11-088495 | 3/1999 |
| JP | H11-187454 | 7/1999 |
| JP | H11-205837 | 7/1999 |
| JP | 2000-102059 | 4/2000 |
| JP | 2000-312258 | 11/2000 |
| JP | 2001-189774 | 7/2001 |
| JP | 2001-224075 | 8/2001 |
| JP | 2001-251395 | 9/2001 |
| JP | 2001-251682 | 9/2001 |
| JP | 2001-350782 | 12/2001 |
| JP | 2002-094614 | 3/2002 |
| JP | 2002-101155 | 4/2002 |
| JP | 2002-108794 | 4/2002 |
| JP | 2002-152335 | 5/2002 |
| JP | 2002-176449 | 6/2002 |
| JP | 2003-8655 | 1/2003 |
| JP | 2003-116175 | 4/2003 |
| JP | 2003-517781 | 5/2003 |
| JP | 2003-169147 | 6/2003 |
| JP | 2003-196469 | 7/2003 |
| JP | 2003-296556 | 10/2003 |
| JP | 2004-013303 | 1/2004 |
| JP | 2004-30371 | 1/2004 |
| WO | WO 97/24010 | 7/1997 |
| WO | WO 98/03923 | 1/1998 |
| WO | WO 98/12644 | 3/1998 |
| WO | WO 00/39964 | 7/2000 |
| WO | WO 00/69140 | 11/2000 |
| WO | WO 01/45368 | 6/2001 |
| WO | WO 01/54368 | 7/2001 |
| WO | WO 01/55915 | 8/2001 |
| WO | WO 01/69387 | 9/2001 |
| WO | WO 01/71925 | 9/2001 |
| WO | WO 02/30105 | 4/2002 |
| WO | WO 02/093959 | 11/2002 |
| WO | WO 03/025776 A1 | 3/2003 |
| WO | WO 03/054717 | 7/2003 |
| WO | WO 03/085539 A1 | 10/2003 |
| WO | WO 03/096559 | 11/2003 |

OTHER PUBLICATIONS

First Examination Report for European Patent Application No. 05251113.6, mailed Oct. 2, 2007.
U.S. Appl. No. 11/621,350, filed Jan. 9, 2007, Lenard.
U.S. Appl. No. 11/549,448, filed Oct. 13, 2006, Brunson et al.
Andy Zmolek; "SIMPLE and Presence: Enterprise Value Propositions," Avaya presentation, 16 pages, presented Jan. 24, 2002.
Atkins et al "Common Presence and Instant Messaging: Message Format," Network Working Group (Jan. 9, 2003), available at http://www.ietf.internet-drafts/draft-ietf-impp-cpim-msgfmt-06.txt, 31 pages.

(56) References Cited

OTHER PUBLICATIONS

Berners-Lee et al.; "Uniform Resource Identifiers (URI); Generic Syntax," Network Working Group, Request for Comments 2396 (Aug. 1998), 38 pages.
Bill Michael, The Politics of Naming www.cConvergence.com (Jul. 2001) pp. 31-35.
Chavez et al., "Interactive Applications of Personal Situation-Aware Assistants", Computers and Graphics, Pergamon Press LTD., Oxford, GB, vol. 23, No. 6, Dec. 1999, pp. 903-915, XP 004187839, ISSN: 0097-8493.
Crocker et al. "Common Presence and Instant Messaging (CPIM)," Network Working Group (Aug. 14, 2002), available at http://www.ietf.internet-drafts/draft-ietf-impp-cpim-03.txt, 33 pages.
Dawson et al.; "Vcard MIME Directory Profile," Network Working Group (Sep. 1998), available at http://www.ietf.org/rfc/rfc2426.txt?number=2426, 40 pages.
Day et al. "A Model for Presence and Instant Messaging," Network Working Group (Feb. 2000), available at http://www.ietf.org/rfc/rfc2277.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
Fielding et al.; "Hypertext Transfer Protocol—HTTP/1.1," Network Working Group, Request for Comments 2068 (Jan. 1997), 152 pages.
G. Klyne et al., "Instant Messaging using APEX", Network Working Group, Jun. 1, 2001, 19 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Grigonis, Computer Technology Encyclopedia (2000) pp. 342-345, 389-392.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Holtman et al; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
J. Rosenberg et al., "SIP extensions for Instant Messaging", Internet Engineering Task Force, Jul. 18, 2001, 22 pages.
"MIT Project Oxygen Publications", 2 pages, undated.
MIT Project Oxygen, "Oxygen: Pervasive, Human-Centered Computing" MIT Laboratory for Computer Science, MIT Artificial Intelligence Laboratory (May 2002).
Pervasive, Human-Centered Computing, MIT Project Oxygen, published by MIT Laboratory for Computer Science (May 2002).
Richard Grigonis, Computer Telephony Encyclopedia (2000) pp. 367-375.
Richard Grigonis,. Computer Telephony Encyclopedia (2000) pp. 413-430.
Richard Shockey, 'ENUM: Phone Numbers Meet the Net' www.cConveroence.corn (Jul. 2001) pp. 21-30.
Rose et al.. "The APEX Presence Service," Network Working Group (Jan. 14, 2002), available at http://www.ieff.org/internet-drafs/draft-ielf-apex-presence-06.txt, 31 pages.
Schulzrinne, H., et al., "The Session Initiation Protocol: Internet-Centric Signaling", IEEE Communications Magazine (Oct. 2000), vol. 38, No. 10, pp. 134-141.
Sugano et al, "Common Presence and Instant Messaging (CPIM) Presence Information Data Format," Network Working Group (Dec. 2002), available at http://www.lettorofinternet-drafts/draft-letf-impo-cnim-oidf-07.bct, 26 pages.
The MIT Oxygen Project, Cambridge, MA, Apr. 25-26, 2000.
XML-NS Tim Bray et al., "Namespaces in XML", W3C recommendation: xml-names, Jan. 14, 1999 12 pages.

"Phone Mail Override for Incoming Calls", IBM Technical Disclosure Bullitin, vol. 37, No. 11, Nov. 1994.
Partial European Search Report for European Patent Application No. EP 05251113, completed Jun. 7, 2005.
Communication dated Nov. 4, 2005 from the European Patent Office transmitting the European Search Report under Rule R.44 or R.45 EPC for counterpart Application No. 05251113.6-2416, 6 pages.
Live2Support, "Features". Available at http://web.archive.org/web/20040206215142/www.live2support.com/features_live_chat.php>, undated, 4 pages.
Salvator, Dave, "Review: Skype Voice Chat", Available at http://www.findarticles.com/p/articles/mi_zdext/is_200310/ai_ziff109903>, Extreme Tech, Oct. 2003, 2 pages.
Venus Valley, "Live chat for your website", Available at http://www.pppindia.com/vvchat/shots.htm>, Venus Valley Live Support, 2003, 2 pages.
Communication dated Jun. 21, 2005 from European Patent Office transmitting the partial European search report under Rule 46(1) EPC, 5 pages.
e-Vantage Solutions, "Customer Service Window" (printed Oct. 22, 2003), available at http://www.evgl.com/dsw.html, 2 pages.
WiredRed News Release, "WiredRed to Provide Secure Instant Messaging for Eight New Call Center Customers" (printed Oct. 22, 2003), available at http://www.wiredred.com/news_release_callctr.html, 2 pages.
CC News: Call Center Technology, "FaceTime gives voice, vision to instant messaging" (printed Oct. 22, 2003), available at http://www.ccnews.com/may2000/depts/cct/cctstory2.htm, 2 pages.
FaceTime Communications Press Release, "Amica Insurance Selects FaceTime Communications to Provide Instant Messaging-Based Customer Service in Enterprise" (Jun. 25, 2001), available at http://www.factime.com/pr/pr010625.shtm, 2 pages.
FaceTime Communications website, "Overview" (printed Oct. 30, 2003), available at http://www.facetime.com/solutions.shtm, 4 pages.
FaceTime Communications website, "Customer Services" (printed Oct. 30, 2003), available at http://www.facetime.com/custsvcs.shtm, 4 pages.
FaceTime Communications website, "Presence Management" (printed Oct. 30, 2003), available at http://www.facetime.com/presence.shtm, 3 pages.
Trudy Walsh, "Instant messaging boosts service at Texas call center" *GCN* (Nov. 2001), available at http://www.gcn.com/cgi-bin/udt/im.display.printable?client.id=state2&story.id=16765, 2 pages.
Ovisoft Technologies, "Ovisoft Messenger—Call Center Solutions" (printed Oct. 22, 2003), available at http://www.ofisoft.com/solutioncallcenter.htm, 1 page.
CosmoCall Universe™, "The Next Generation IP Contact Center Platform" (printed Oct. 21, 2003), available at http://www.cosmocom.com/ProductInfo/Product.htm, 18 pages.
CosmoCall Universe™, "The Carrier-Grade, All-IP Contact Center Platform for Next Generation Network-Based Services" (circa 2002) 3 pages.
CommWeb.com "Enterprise Customer Interfaces: Application Messaging Via Instant Messaging" (Dec. 9, 2002), available at http://www.commweb.com/article/COM20021209S0001/2, 3 pages.
Steve Taylor et al., "SIP in the call center" *Network World Convergence Newsletter* (Aug. 27, 2003), available at http://www.nwfusion.com/newsletters/converg/2003/0825converge2.html, 4 pages.
Stephanie Losi, "Instant Messaging for Call Centers Leaves 'Em Smiling" www.CRMDaily.com (Jun. 4, 2001), available at http://www.newsfactor.com/perl/story/10246.html, 3 pages.
U.S. Appl. No. 10/865,114, filed Jun. 9, 2004, Craft.
U.S. Appl. No. 11/542,295, filed Oct. 3, 2006, Somani.
U.S. Appl. No. 11/626,217, filed Jan. 23, 2007, Coughlan.
Background of the Invention of the above-captioned application (previously provided).
Official Action for Canadian Patent Application No. 2,497,421, mailed Apr. 17, 2008.
Examiner's Office Letter (including translation) for European Patent Application No. 2005-050197, mailed Aug. 4, 2008.

(56) References Cited

OTHER PUBLICATIONS

U.S. Appl. 12/147,355, filed Jun. 26, 2008, Craft et al.
Examiner's Office Letter (including translation) for Japanese Patent Application No. 2005-050197, mailed Mar. 2, 2009.
Official Action for Canadian Patent Application No. 2,497,421, mailed Jan. 26, 2009.
Okuyama et al., "Instant Message Technique for Supporting New Mobile Service", FUZITSU, Fuzitsu Inc., Jul. 13, 2001, vol. 52, the fourth number, pp. 262-267 (translated abstract).
Examiner's Office Letter (including translation) for Japanese Patent Application No. 2005-050197, mailed Aug. 10, 2009.
Official Action for Canadian Patent Application No. 2,497,421, mailed May 27, 2010.
Examiner's Refusal Decision (including English translation) for Japanese Patent Application No. 2005-050197, mailed Jun. 21, 2010.
Official Action for European Patent Application No. 05251113.6, dated May 17, 2011.
Appeal Examiner's Office Letter (translation only) for Japanese Patent Application No. 2005-050197, mailed Jul. 19, 2011.
U.S. Appl. No. 12/566,436, filed Sep. 24, 2009, Zmolek.
Moran et al., "Requirements for Presence Specific Event Notification Filters," http://www.tools.ietf.org/html/draft-moran-simple-pres-filter-reqs-OO, Jan. 2003, 9 pages.
Official Action for Canadian Patent Application No. 2,497,421, mailed Aug. 1, 2011.
Official Action for Canada Patent Application No. 2,497,421, dated Aug. 1, 2013 4 pages.

\* cited by examiner

USING BUSINESS RULES FOR DETERMINING PRESENCE

FIELD OF THE INVENTION

The present invention is directed to contact centers and specifically to a contact center configured for receiving and responding to instant messaging communications from customers.

BACKGROUND OF THE INVENTION

Instant messaging is the fastest growing communications channel in history. As will be appreciated, instant messaging, in a normal application, enables near real-time text communications between two or more individuals. Instant messaging allows one to maintain a list of people, such as a buddy list or contact list, that one wishes to communicate with. In a typical application, sending an instant message to a device opens up a small window on the device's Graphical User Interface or GUI where the receiver can type in messages that both the receiver and sender can view. A party is notified when one of the people on the list is on line and the contact information of the person is provided. The party's contact information is also forwarded to the people on the contact list that are signed on. To initiate a contact, a person clicks on the name of a person on the list that is on line and a window opens into which text can be entered. The person can then send an inputted message by clicking on a send command. Typically, communication is directly between the two clients. The other person gets the message and responds. The window that each person views expands to include a scrolling dialog of the conversation. When the conversation is completed, the message window is closed. When a person goes off line, the clients of each person on the list that are currently on line are notified that the person is now off line. The temporary file that contained the connection information, and typically the conversation itself, is deleted. The instant message display can be configured by the user using various instant message controls, such as font, emoticons, and color. Examples of instant messaging protocols include AOL Instant Messenger™, ICQ™, MSN Messenger™, Yahoo! Messenger™, Jabber™, Session Initiation Protocol/Instant Messaging and Presence Leveraging Extensions or SIMPLE, Extensible Messaging and Presence Protocol or XMPP, Sametime™, Everybody™, and Trillian™, and the Instant Messaging and Presence Protocol. These protocols normally use one of the Transmission Control Protocol and User Datagram Protocol for data transmission over the Internet.

The increasing use of instant messaging in both personal and business communications necessitates enterprise contact or interaction centers to be configured to interact with instant messaging protocols. Conventional contact centers having instant messaging functionality use real-time identification and detect agents' presence online to find the right expert for immediate problem collaboration and resolution. An example of such a contact center instant messaging system is the FaceTime Instant Message Director™. The ability of customers, however, to view the presence and availability of individual agents and contact them directly disregards what the contact center industry has learned and developed over the last three decades about the efficient usage of call center resources.

SUMMARY OF THE INVENTION

These and other needs are addressed by the various embodiments and configurations of the present invention. The present invention is directed to various contact center embodiments associated with servicing instant messages received from customers.

In a first embodiment, a method for interacting with a customer in a contact center includes the steps of:
(a) providing to a customer one or more instant message address(es) associated with the contact center, with the customer adding the instant message address to a list of instant message addresses in a buddy list associated with the customer;
(b) a presence notification agent determining, for each of the instant message address(es), corresponding presence information;
(c) the presence notification agent providing the presence information to a presence server associated with the contact center; and
(d) the presence server providing the presence information to a communication device associated with the customer.

This embodiment can provide an efficient means of delivering presence information to a customer before the customer goes through the effort of contacting the contact center. The embodiment can also provide an effective means for controlling inbound instant message volume during high contact center resource demand periods.

In a second embodiment, a method for interacting with a customer in a contact center is provided that includes the steps of:
(a) receiving an instant message notification from an instant messaging service associated with a customer that the customer is available to receive instant messages at a customer communication device; and
(b) in response to the instant message notification, forwarding to the customer communication device an instant message containing an invitation to the customer to interact with the contact center.

This embodiment can be highly beneficial where a contact center has scheduled an outgoing contact to a customer. By using instant messaging, the contact center does not need to incur unnecessary expense in repeated unsuccessful contact attempts using other communication media.

In a third embodiment, a method for servicing an instant message received from a customer by a contact center is provided that includes the steps of:
(a) receiving an instant message from a communication device associated with a customer, the instant message requesting service by a resource associated with the contact center;
(b) selecting an agent to service the instant message;
(c) providing the instant message to the selected agent;
(d) forwarding at least one instant message from the selected agent to the customer's communication device; and
(e) for a selected period of time, routing any instant message received from the communication device's instant message address to the selected agent.

The predetermined period of time takes into account the sessionless nature of instant messaging. An instant messaging interaction between two entities can continue indefinitely even with long pauses between instant messages. The predetermined time can be a set period after receipt of an instant message and/or expire upon receipt of a termination command from a contact center resource.

Although instant messaging is sessionless, a type of contact center "session" may be created in which instant messages from a selected instant message handle are routed only to a selected resource for a selected period of time.

The embodiment can reduce agent frustration and loss of productivity by ongoing instant message pop-ups appearing on the agent's graphical user interface after the agent has attempted to terminate an instant messaging session with an irate customer.

In a fourth embodiment, a method for conducting an outbound instant message campaign in a contact center is provided that includes the steps of:

(a) providing a list of instant message addresses;

(b) determining whether an entity associated with each of the instant message addresses is available to receive and respond to an instant message; and (c) when an entity associated with an instant message address is not available within a selected period of time, contacting the unavailable entity by a communication medium other than instant messaging.

Instant messaging, with its presence capability, can provide a capability to proactively contact customers based on their availability and presence.

The various embodiments can provide a number of advantages compared to conventional contact centers. For example, the present invention can provide efficient and customer attractive methodologies for servicing instant messages in contact centers. The methodologies, by coupling established contact center business rules, productivity tools, and reporting with instant messaging for transport and user interface, can be highly beneficial not only for contact centers but also for customers. The methodologies can interface with off-the-shelf instant messaging software currently in use by customers. The methodologies can provide communications with customers at a significantly reduced expense compared to other communication channels, such as telephone calls. The methodologies can provide a more customer acceptable interface with the contact center than is currently available with automated voice resources, such as IVR's. Customers typically dislike conversing with an automated component; however, instant messaging, when automated, can provide a distinctly different "look and feel" than automated voice interfaces.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Interaction Center

Figure 1:
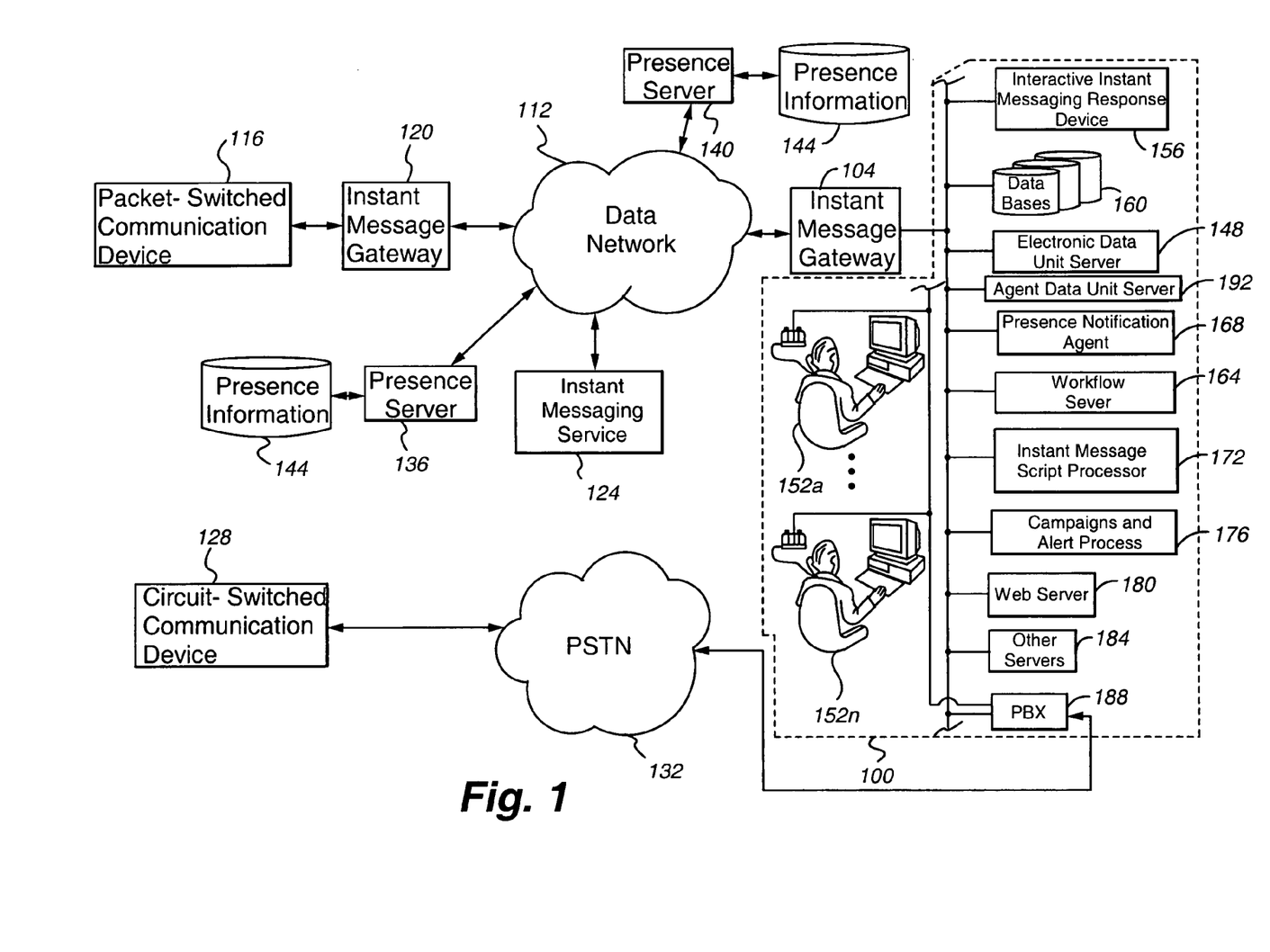
FIG. 1 depicts an interaction center according to a first embodiment of the present invention.

FIG. 1 depicts an architecture according to a first embodiment of the present invention. The architecture includes an interaction center 100, an instant message gateway 104 in communication with the interaction center 100, a packet-switched data network 112 in communication with the gateway 104, a (customer) packet-switched communication device 116 in communication with a (customer) instant messaging gateway 120 and served by a (customer) instant messaging service 124, a (customer) circuit-switched communication device 128 in communication with the circuit-switched Public Switched Telephone Network 132 which is in turn in communication with the interaction center 100. Each of the customer communication device 116 and interaction center 100 have an associated presence server 136 and 140, respectively, each of which maintains a database 144 of presence information.

The interaction center 100 can be any modified interaction center, such as a modified version of the Avaya™ Interaction Center™. The interaction center 100 is a comprehensive, modified e-Customer Relationship Management™ (eCRM) platform that provides consistency across communication channels, through common workflows and business rules, shared customer profile information, common cross-sell and up-sel strategies, visibility to agents of previous interactions across channels, common knowledge base, and consolidated management reporting.

The interaction center-side instant message gateway 104 receives customer-side instant messages and converts the messages into suitable communications for transmission within the interaction center 100 and receives interaction center-side messages and converts the messages into instant messages for transmission to the customer. When an instant message is received from a customer, the gateway 104 creates an instant messaging "session", assigns an electronic data unit to the interaction by interacting with the electronic data unit server 148 (discussed below), and conferences into the session an agent 152 and/or the interactive instant message response device 156 (discussed below).

The packet-switched network 112 can be any type of data network, such as the Internet. In a preferred embodiment, the network 112 uses a presence-based protocol, such as the Session Initiation Protocol or SIP. The network 112 typically includes proxies, registrars, and routers for managing packet flows.

The customer-side instant message gateway 120 is conventional.

The customer-side packet-switched communication device 116 can be any suitable packet-switched communication device, such IP hardphones such as the Avaya, Inc.'s, 4600 Series IP Phones™, IP softphones such as Avaya, Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and packet-based loudspeaker paging and announcement units.

The customer-side circuit-switched communication device 128 can be any suitable circuit-switched communication device, such as wired and wireless telephones, PDAs, pagers, facsimile machines, modems, H.320 video phones and conferencing units, voice messaging and response units, traditional computer telephony adjuncts, and loudspeaker paging and announcement units.

The instant messaging service 124 can be any provider of instant messaging services, such as AOL™, ICQ™, MSN™, Yahoo!™, Jabber™, Sametime™, Everybody™, and Trillian™.

The presence servers 140 and 136 collect published presence information about one or more communication devices, or a user thereof or other entity, and stores the collected information in the associated presence information database 144. The presence servers typically retrieve presence information by querying against the entity's identity as opposed to an address. In the presence information database all presence information is indexed by an entity's identity rather than address. The presence server provides the collected information to other network entities in response to queries. The presence server can collect only information respecting an entity's interaction with the various entities of FIG. 1 and/or other information provided directly or indirectly by the entity. The presence server can interact with additional presence services (now shown) that continually collect and redistribute availability data from publishing sources authorized by the subscriber.

As used herein, "presence information" means any information associated with one or more network node(s) and/or endpoint device(s), such as one or more communication devices, that is in turn associated with a person, business, organization, or identity. Examples of presence information include registration information, information regarding the accessibility of one or more endpoint devices, an endpoint's telephone number or address, the recency of an endpoint device by an entity, recency of authentication by the entity to a network component, the geographic location of the endpoint device, the type of media, format language, session and communications capabilities of the currently available communications devices, the preferences of a person or entity (e.g., for an individual contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted and for an enterprise such as the contact center 100 contact addresses for different subjects/skills, staffing levels, queue lengths, hours of operation, and actual or estimated wait times for servicing.

Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile. "Contact" means a connection or request for connection between two or more communication devices. The contact can be, for example, a telephone call, a chat session, a VoIP session, a conference call, instant message session, and multi-media session. Communication devices can be any type of communicating device, whether configured for circuit-switched or packet-switched networks, including, for example, IP hardphones such as the Avaya, Inc. 6400™, 2420™, and 4600™ series phones, Personal Digital Assistants or PDAs, Personal Computers or PCs, laptops, pagers, facsimile machines, modems, wired and wireless telephones, headsets, computing tablets, wearable communication devices, or any device capable of hosting software applications providing communications services such as e-mail clients, browsers, softphones, instant messaging, chat, audio conferring, etc. or devices which offer a combination of any such services.

"Presence" and "availability" are not necessarily synonymous. "Presence" typically indicates, with reference to an entity, not only who the entity is and the current existence of a communication channel to the entity but also the type of communication device associated with the channel, the location of the device, and how communications occur with the device. Presence implies the what and how to interact. "Availability" in contrast typically refers to whether or not the entity is currently available to receive a communication by a selected channel.

The interaction center 100 typically includes a plurality of databases 160, an electronic data unit server 148, a work flow server 164, an automated presence notification agent 168, an interactive instant messaging response device 156, an instant message script processor 172, a campaigns and alerts process 176, an agent data unit server 192, a Web server 180, other servers 184, a telecommunications switch 188, such as a Private Branch Exchange or PBX, and a plurality of agents 152*a-n*.

The databases 160 include a variety of types of information, including customer profiles (e.g., customer identification, contact information (including instant message address or handle), business history, status or category, contact history, customer value, customer preferences, and the like), knowledge base (including associations of text with a preselected instant message text response), business rules, and agent information.

The electronic data unit server 148 can be any suitable device for recording aspects of customer interactions from arrival to completion. In the case of instant messaging, the electronic data unit server 148 assigns an electronic data unit to an instant messaging session to record the text of the instant messages in the form of a transcript for later presentation to a live agent and/or forwarding to the contacting customer. The electronic data unit server 148 typically shares data in real-time across distributed Web, email, telephony, database, legacy and desktop systems. Whenever an instant message session is initiated by the gateway 104, an electronic data unit and a unique electronic data unit identifier are assigned to the session. Because there is no hang up in instant messaging, the transcript for a particular session is terminated when a time out occurs, when a disconnect command is received from the customer's communication device, when a disconnect command is received from an agent participating in the instant messaging session, when a disconnect command is received from the interactive instant messaging response device, and the like.

The workflow server 164 performs media independent contact routing and customization, multi-channel agent blending, and agent interaction scripting.

The presence notification agent 168 provides to the customer's communication device 116 presence information when the interaction center 100 directly receives an instant message from the customer's communication device 116 and provides presence information for each administered instant message handle to the presence server 140 to provide to a customer when an administered handle is on the customer's "buddy" list. The presence information provided by the agent 168 can be for a selected administered instant message handle, a selected agent, a group of selected agents (such as a group of agents having one or more common skills, e.g., a workgroup, or servicing a common queue), or the interaction center as a whole. In a preferred embodiment, the presence information for a specific agent is hidden or not provided to the customer; rather, the presence information for a grouping or set of agents of which the agent is part is provided. The presence information can be associated with an actual or estimated wait time for servicing of an instant message from the customer, the hours of operation of the interaction center for servicing instant messages, the number of staffed live agents 152 or the percentage agent staffing levels of the interaction center, an indication of the queue loading for the skill requested, and the current availability of an agent to handle an instant message session with the customer. The individual agent presence and state information can be obtained from the agent data unit server 192 (discussed below). The presence and state information of the group can be obtained from the ADN server or business rules.

The specific presence information to be provided to each customer's communication device can be selected based on business rules. The business rules can be based, for example, on the customer value, skills requested, contact history, customer entitlements, customer language, customer preferences, and other attributes. For example, a higher value customer or a customer requesting a particular skill can receive more detailed and/or different presence information than a lower value customer or a customer requesting a different skill. In this way, the volume of incoming instant messages can be controlled seamlessly and dynamically.

The presence information is typically provided by querying the interaction center workflow server 164 for each instant message handle in a set of administered instant message handles (e.g., help@xyz_company.com, helpdesk@xyz_company.com, and sales@xyz_company.com). The querying can be done using an E-Commerce Connector™ (not shown) that allows the instant message gateway 104 to send a HyperText Transfer Protocol or HTTP request that invokes a workflow that runs and returns an eXtended Markup Language or XML document. For a customer initiated contact, the HTTP request typically contains the customer's instant message handle, profile, any transcript that is part of the current session (for transfers), customer identification information, and the like. By having this information come through a workflow, the enterprise can specify the business rules for showing presence. Each communication device associated with a customer can have the presence information displayed for those "buddies" that they have registered for. For example, if a customer has an associated PC, PCA and cell phone, each of which is registered with the interaction center and/or the instant messaging service 124, the presence information will be transmitted to and displayed on each of the three devices.

The interactive instant messaging response device 156 is a customer self-service instant messaging device that performs content analysis on customer instant message inquiries by known techniques, such as the natural language search and retrieval mechanism of a Web self service knowledge base, and self-help Universal Resource Locators and returns suitable instant messaging responses (typically selected from among a plurality of possible predetermined responses) to the contacting customer, prompts customers by suitable instant messages for problem diagnostic information to be used in routing or self-service, sends customizable on hold treatment to the customer's instant message client, and can schedule outbound agent contacts from the interaction center to the customer using instant messaging. The on hold treatment can be in the form of instant messages or links to selected Web content. The on hold treatment can include actual or estimated wait times, suggest alternative resources for use by the customer, and send marketing messages. The automated responses provided by the device 156 can be effected using a knowledge base look up or scripting as is done with a conventional Interactive Voice Response or IVR unit. The knowledge base look up would access a listing of frequently asked questions and, when the instant message contains one or more keywords associated with a frequently asked question, provide a corresponding predetermined response to be provided to the customer.

The instant message script processor 172 verifies the presence of the customer's instant message address (or whether the customer is currently available to receive and respond to an instant message) that is targeted for an outbound instant message. This is typically done by querying the presence server 136 associated with the customer or the communication device 116 associated with the customer. When the customer is not "present", the processor 172 monitors the specified instant message address through the instant message gateway 104 for a notification from the presence server 144, or periodically queries the presence server for updated presence information that the customer is present. When the customer is present, the processor 172 instructs the interactive instant messaging response unit 156 to send a predetermined instant message to the customer's communication device 116.

The campaigns and alerts process 176, by analyzing customer information such as the customer information in the databases 160, identifies the customers who are targeted for an outbound instant message campaign or alert. This may be an alert from some external event (such as a change in a stock or fund price) or a sales campaign. The instant message handle or identifier for the specific customer is stored in the customer's profile located in the databases 160 along with the customer's outbound phone number(s) and email address(es).

The agent data unit server 192 records agent presence and state from login to logout and the states of all contact center queues (not shown). In this way, it optimizes real time resource allocation decisions and enables load balancing across resources.

The Web server 180 provides access to the Internet. As noted, a user can be sent an instant message that points them to a Web site. By accessing the Web site, they can complete a self-service interaction. Also, connecting to a Web site can create events that can be used for reporting (e.g., connecting to a Web site reporting stock or fund prices to report the current price to a customer via instant messaging).

The other servers 184 can include one or more of a facsimile server, a data connector server (which provides common data access layer for integrating relational data, external systems, legacy data, and transactional systems), and an email server.

The PBX 188 can be any suitable telephony switch, such as the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ private-branch exchange (PBX)-based ACD system; Avaya Inc.'s MultiVantage™ PBX, or Avaya Inc.'s, S8300™ media server. Other types of known switches are well known in the art and therefore not described in detail herein. The switch typically is a stored-program-controlled system.

The agents 152 each typically have access to a circuit-switched telephone and a PC. To avoid agent confusion and proliferation of desktop clients, a single web agent is preferably on the agent desktop to handle text chat and instant messages for all service providers. The agent can conference in other agents or resources into the instant messaging session as needed and transfer an instant messaging session to another agent or resource.

The Operation of the Presence Notification Agent

Figure 2:
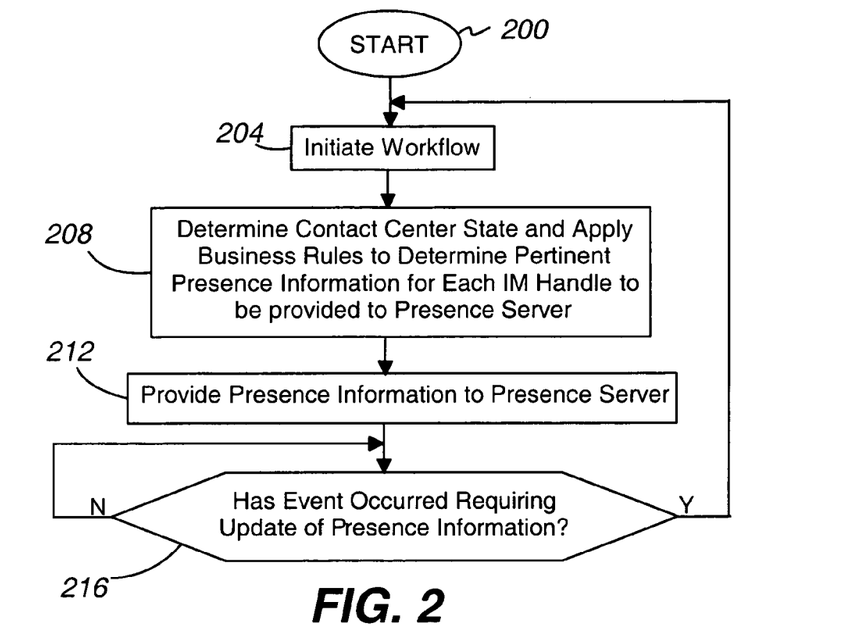
FIG. 2 is a flowchart depicting the operation of the presence notification agent according to a second embodiment of the present invention.

FIG. 2 depicts another operational configuration of the presence notification agent 168. In this operational configuration, the agent 168 provides, for each administered instant message handle, pertinent presence information to the contact center's presence server 140.

In step 200, the contact center initiates operation or opens for business.

In step 204, the agent 168 interacts with the workflow server 164 to initiate a workflow for each of the administered instant message handles. This can be done using the E-Commerce Connector™ that will allow the agent 168 to send an HTTP request that invokes the workflow for a specified instant message handle.

In response, the server 164 in step 208 determines the contact center state by querying the agent data unit server 192. The contact center state includes contact center staffing levels for each skill or queue, queue lengths or populations, actual and/or estimated queue wait times for each skill or queue, and the like. The workflow server 164 applies business rules to the contact center state to determine the pertinent presence information to be provided for each administered instant message handle. For each administered instant message handle, the workflow server 164 selects among a plurality of differing predetermined presence information messages. For example, for high instant message volume and relatively low agent staffing levels for a specified queue, the business rules may specify that the presence server 164 provide the hours of operation of the contact center to discourage contacts. For low instant message volume and relatively high agent staffing levels for the queue, the rules may specify that the presence server 140 provide a message indicating that the estimated wait time is less than a selected time or that an agent is currently available to service the customer. Alternatively, the current estimated wait time can be provided regardless of queue volume and staffing levels. The workflow server 164 returns to the agent 168 an XML document containing the pertinent presence information. In step 212, the presence information is provided to the presence server 140 for each administered instant message handle.

In decision diamond 216, the agent 168 determines whether an event has occurred requiring the update of presence information. For a selected administered instant message address, the event can be the passage of selected period of time, a significant change in queue state (e.g., a change in queue lengths of more than a selected number of enqueued items), a significant change in agent staffing levels (e.g., a change in staffing levels of more than a selected number of agents), a change of more than a selected time increment in the actual wait time to service enqueued items, and a change of more than a selected time increment in the estimated wait time to service enqueued items. If not, the agent 168 repeats the decision diamond 216 after a selected period of time or upon the receipt of an alert from another component in the contact center, such as the agent data unit server 192. If so, the agent 168 returns to step 204 and performs the ensuing steps for all administered instant message handles or only for the handle for which the event is applicable.

Figure 5:
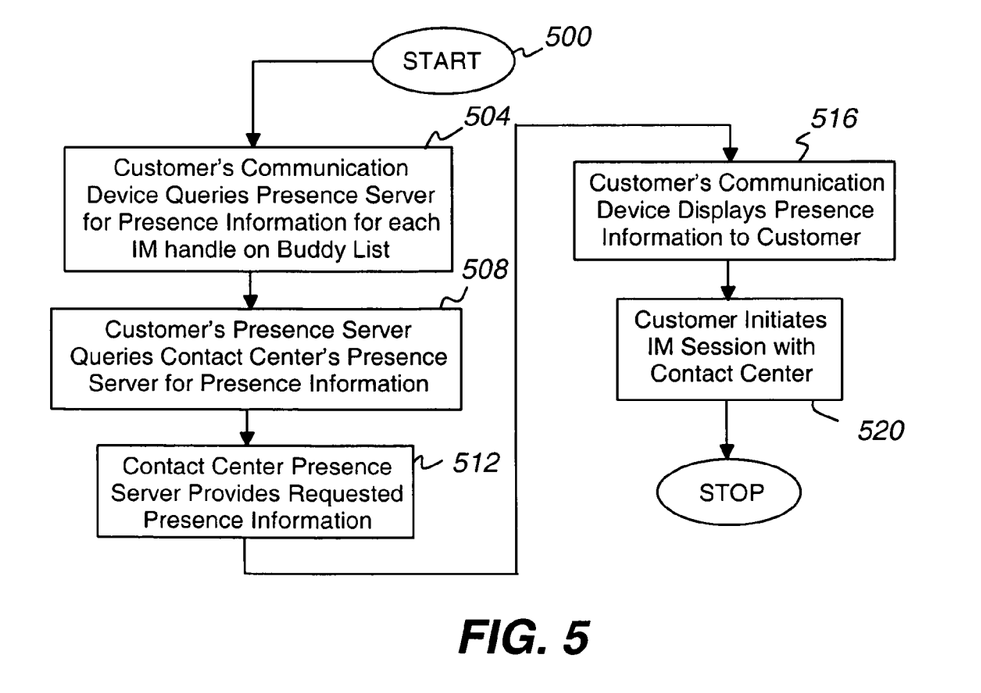
FIG. 5 is a flowchart depicting the steps to provide presence information to a customer's communication device.

FIG. 5 illustrates the delivery of the presence information to the customer's communication device 116.

In step 500, the customer adds the instant message handle or address of the interaction center (helpdesk@xyz_company.com) as a buddy icon to the customer's instant messaging "buddy" list. This can be effected in several ways. For example, the customer can visit the Website of the enterprise interaction center and click on a support link for the desired interaction center support group, which adds the buddy icon to the customer's buddy list of their (favorite) instant messaging client (e.g., the communication device 116). The link can also be sent to the customer's communication device 116 by email from the interaction center 100. The handle can be added manually from email, a phone, print add, and the like. The instant message session can also be launched from a Web page using a link.

In step 504, the customer activates the communication device 116 or otherwise indicates that he or she is available to receive instant messages. As a result, the customer's communication device 116 notifies the instant message service 124 which queries the customer's presence server 136 for presence information associated with each instant message address on the customer's "buddy" list, including the instant message address administered by the contact center.

In step 508, the customer's presence server 136 queries the presence servers associated with each instant message address on the customer's "buddy" list for presence information, including the presence server 140 associated with the instant message address administered by the contact center.

In step 512, the contact center's presence server 140 provides to the customer's presence server 136 the requested presence information previously provided to the presence server by the contact center for the specified instant message address.

In step 516, the customer's presence server 136 or the instant messaging service 124 provides the presence information to the customer's communication device 116, which displays the presence information to the customer in the form of an instant message pop up on the device's GUI.

In step 520, the customer initiates an instant message session with the administered handle of the contact center by entering text into the window on the instant message pop up and clicking the "send" icon. The process continues with step 300 of FIG. 3.

Operation of the Interactive Instant Messaging Response Device

Figure 3:
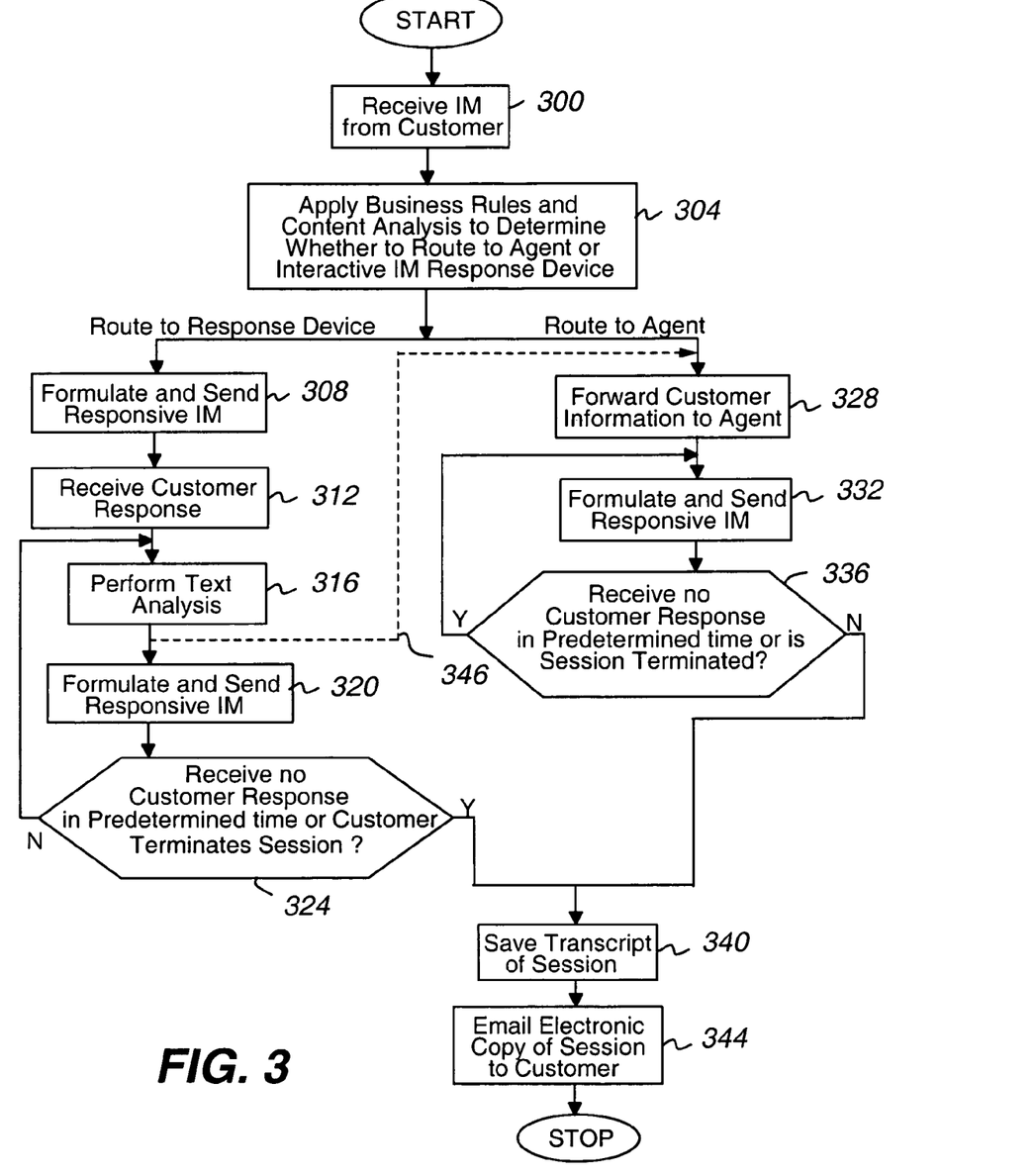
FIG. 3 is a flowchart depicting the operation of the interactive instant messaging response device and the instant message response agent according to a third embodiment of the present invention.

The operation of the interactive instant messaging response device 156 will now be described with reference to FIG. 3.

The instant message is received from the customer's communication device 116 in step 300.

In step 304, the workflow server performs a workflow on the instant message received from the customer's communication device 116. The workflow retrieves appropriate information from the databases 160 (e.g., customer information, contact center conditions, and the like) and applies business rules as set forth above to determine where to route the instant message. An electronic data unit is dedicated to the session to generate a transcript. The instant message may be routed to an agent 152 or to the interactive instant messaging response device 156.

When the instant message is routed to the interactive instant messaging response device 156, the device 156 is conferenced in and, in step 308, formulates and sends (via the gateway 104) an instant message responsive to the instant message sent by the customer, thereby initiating an instant messaging session. The response could be in one or both of two forms. In one form, the response is an answer to a question contained in the instant message. In the other form, the response is a question requesting additional information from the customer before the customer's request can be further processed. The response text is typically based on textual analysis of the received instant message. In a typical textual analysis, the message text is parsed and content analysis performed. The response text is typically predetermined depending upon the results of the textual analysis.

In step 312, the device 156 receives (via the gateway 104) a customer instant message response to the previously sent instant message.

In step 316, textual analysis is performed on the instant message text to select an appropriate response.

In step 320, the device 156 formulates an appropriate instant message response and sends the response via the gateway 104 to the customer's communication device 116.

During processing of the customer's instant message, the customer typically receives feedback about what is happening with the interaction. This feedback can be in the form of canned or predetermined text interim instant messages. The messages can, for example, say that "Your instant message is being processed and a reply will be sent to you within 1 minute."

As shown by decision diamond 324, there are several ways that the instant messaging session can be terminated. In one way, no response is received from the customer within a selected or predetermined time and a time out occurs. In that situation, the interaction center terminates the session. When the interaction center (or agent) terminates a session with a customer, a termination notification is sent to the customer and the customer will be unable to send further instant messages to the interaction center and/or agent as part of the same session. In another way, the customer's instant message indicates that the session is terminated. In another way, the interaction center itself terminates the session for business reasons. In yet another way, the session is terminated by the network due to operational problems. In any event if the session is terminated, the device 156 proceeds to step 340 discussed below. If the session is not terminated, the device 156 returns to step 316.

As shown by the dashed line 346, the device 156 can escalate the instant messaging session at any time by handing the session off to an agent 152. This occurs in response to the application of business rules. The device 156 may determine that it is no longer capable of handling the session or the customer may request to communicate with an agent. The transfer may occur before or immediately after the interaction center responds to an outstanding instant message of the customer. When it is determined that the instant message session needs to be transferred to an agent, the transfer request is sent from the gateway 104 to the workflow server 164 with a set of parameters, including electronic data unit identifier. The workflow server 164 applies routing rules to route the request to the appropriate agent. The workflow server 164 will have the ability to provide for contact progress status to the customer via interim predetermined instant messages.

When the instant message is routed to an agent 152, the agent 152 is conferenced in and, in step 328, receives, along with the instant message, pertinent customer information from the workflow server 164. The information typically includes the customer's instant message handle, the customer identification, customer history, and a transcript of a previous instant messaging session and other interactions between the device 156 and the customer. Typically, the instant message pops up on the agent GUI. The agent is connected via a proxied connection through the gateway 104 and the appropriate instant message Internet Service Provider network to the customer. This configuration allows the agent to remain anonymous by providing only the administered instant message handle to the customer and the gateway and electronic data unit to capture the session transcript.

As will be appreciated, instant messaging is a sessionless interaction between computational components which conflicts with the session emphasis of contact center. To interface sessionless instant messaging with session-oriented contact centers, the instant messaging handle of the customers communication device can be used as a type of session identifier for a selected period of time. For example, within a selected period of time after an instant message is received or sent by the gateway 104, any instant message received from the instant message handle would be routed only to a selected resource. A session identifier may be assigned to the instant message handle of the customer's communication device for the specified period of time to further facilitate the contact center's internal handling of the instant message interaction between the contact center resources and the customer. When an instant message is received from the customer's instant message handle, the handle is mapped against a contact center instant message session table indexing a listing of instant message handles currently conversing with call center resources against corresponding session identifiers to determine the corresponding session identifier to be incorporated in and used to route the intracontact center message corresponding to a received instant message.

Instant messages from a specified handle can be blocked for one or more contact center resources for a specified period of time or perpetually. This is effected by maintaining one or more lists of instant messaging handles which, when received as part of an instant message by the gateway, is dropped by the contact center without routing to a contact center resource. In one configuration, instant messages from a selected customer can be blocked for a selected period of time to provide a type of "cool-down" period for the customer. If the customer has harassed an agent and the agent's supervisor has been unable to deter the harassment, the customer's instant message handle can be added to a temporary blocking list. Any instant messages received from the listed instant message handle for a selected period of time are dropped by the contact center and not forwarded to a contact center resource. Alternatively, the instant message can be routed automatically to a contact center resource other than the agent which terminated the session with the customer.

Based on the instant message text, customer information, and transcript if any, the agent 152 in step 332 formulates and sends (via the gateway 104) an instant message responsive to the instant message sent by the customer, thereby initiating or continuing the instant messaging session. The agent can use canned or predetermined text instant messages to expedite handling. The agent can also send the customer URLs or HTML links embedded in the instant message text.

In decision diamond 336, the agent 152 determines whether or not the instant message has been or should be terminated. If not, the agent 152 returns to step 332. If so, the agent 152 indicates that the instant message session is over, and the interaction center 100 proceeds to step 340. When the session is terminated, the electronic data unit assigned to generate the transcript sets a bookmark in the transcript indicating that the session is ended. Thus, the transcript contains a "start" bookmark to mark the beginning of the transcript for a particular session and an "end" bookmark to mark the ending of the transcript for the particular session.

In step 340, the electronic data unit terminates recording of the transcript and saves the transcript of the session in the customer's records.

In step 344, the interaction center 100 emails a copy of the transcript of the session to the customer.

The agent can escalate the session to a telephone call or other type of communication channel as desired. The agent can conduct both a telephone conversation and an instant messaging session simultaneously. This can be quite useful for a cell phone customer for whom instant messaging can be difficult.

The agents can conference in another agent into the instant message session and transfer instant message sessions to an agent or queue.

The agent instant message client supports spell checking and outbound language analysis (for profanity). Supervisors can monitor agent/customer instant messaging sessions using realtime transcript updates.

Operation of the Instant Message Script Processor

Figure 4:
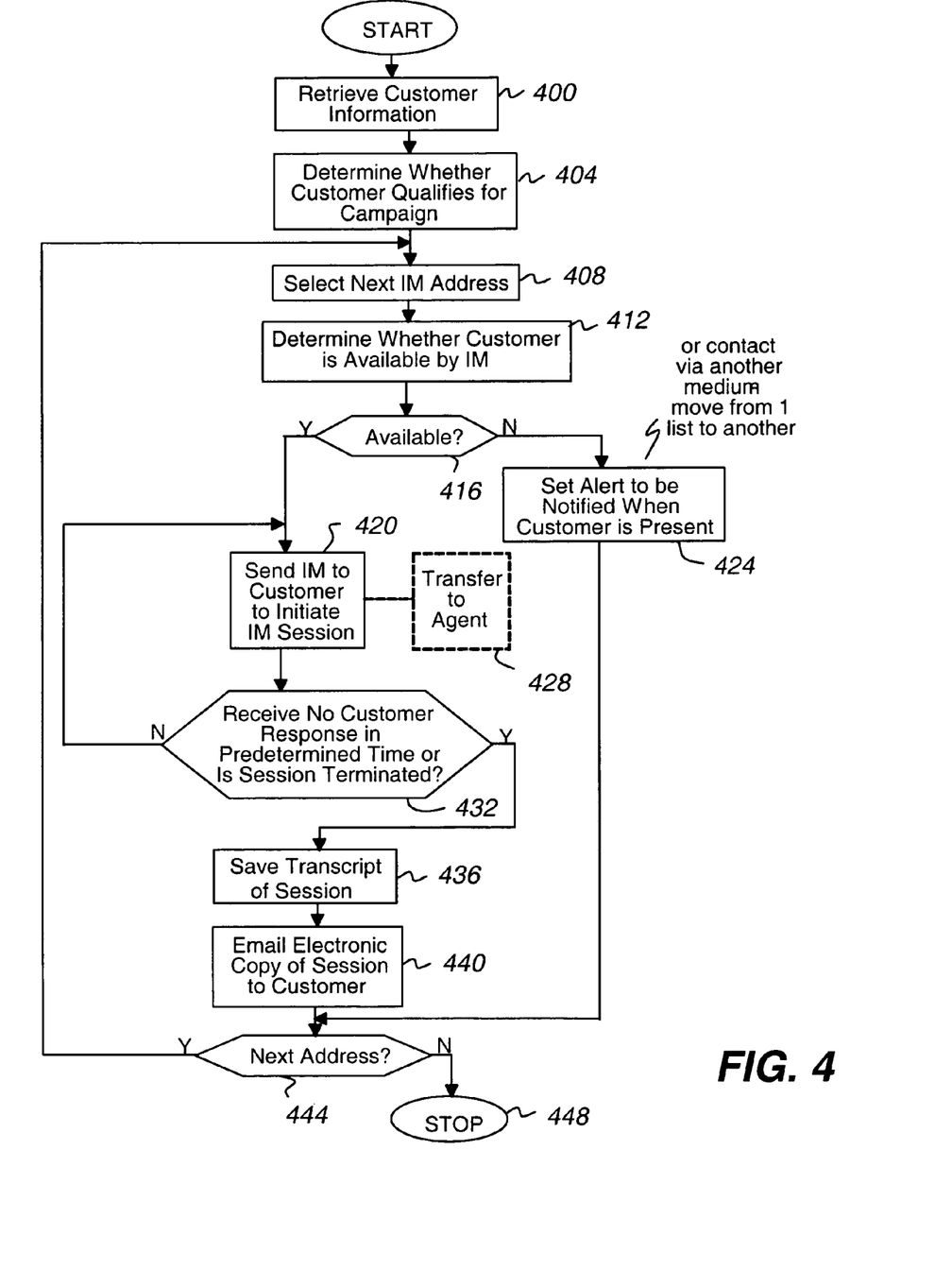
FIG. 4 is a flowchart depicting the operation of the instant message script processor according to a fourth embodiment of the present invention.

FIG. 4 depicts the operation of the instant message script processor 172.

In step 400, the campaigns and alerts process 176 retrieves customer information from the databases 160 and, in step 404, determines whether one or more customers qualify for the campaign or alert and outputs a list of eligible instant message addresses. This is done using predetermined selection criteria. The customer information is not limited to information collected by the enterprise. The information can be acquired from services and other businesses.

For each instant message address on the list, the instant message script processor 172 performs steps 408-440.

In step 408, the processor 172 selects the next instant message address on the list.

In step 412, the processor 172 determines whether the customer is available by instant messaging. This can be done by querying a presence server 136 with which the customer is registered, querying the instant message service 124, and/or by sending an instant message to the customer's communication device 116.

In decision diamond 416, the processor 172 determines, in response to step 412, whether or not the customer is available. If the customer is not available, the processor 172, in step 424, sets an alert to be notified when the customer is present. The processor 172 can wait for a notification from the presence server 136 that the customer is available or perform the presence determining operations in the prior paragraph periodically until the customer is identified as being available or until a selected number of attempts is reached. At that point, the customer can be dropped from the list or added to a different contact list and contacted by another medium or channel, such as by email, telephone, and the like. If the customer is available, the processor 172 proceeds to step 420.

In step 420, the processor 172 interacts with the gateway 104 to send an instant message to the customer's communication device 116. When the message is sent, the processor 172 interacts with the electronic data unit server 148 to assign an electronic data unit to the session and, in appropriate cases, transfer the session to an agent 152 in which case the agent 152 and not the processor 172 thereafter interacts with the customer.

When the session is not yet transferred to an agent 152, the processor 172 scripts instant message responses to the customer if and when the customer sends an instant message in reply to the initial instant message sent by the contact center. As part of the customer interaction, the customer can acknowledge receipt of the message, update its handle, and/or unsubscribe with the interaction center. If at any time, the customer indicates a need for or the processor 172 determines that the customer needs the services of a live agent 152, the processor 172 can escalate the session and interact with the gateway 104 to transfer the session to a live agent 152. As noted above, when the session is transferred to an agent 152 the agent 152 is provided with the transcript of the session, pertinent customer information (such as customer history), and an agent script for the campaign.

After the initial instant message is sent in step 420, the processor 172 in decision diamond 432 determines whether or not the customer has responded to the instant message within a predetermined time or has otherwise not indicated a desire not to interact with the center. If not, the processor 172 returns to step 408. If so, the processor 172 proceeds to step 436.

In step 436, the transcript of the session is saved, and in step 440 an electronic copy of the transcript is emailed to the customer. These steps may be performed only when the customer has forwarded a selected number of instant messages to the interaction center as part of the current session. If the customer has not forwarded the requisite number of instant messages, the center can email part of the script for the campaign to the customer's communication device 116.

In decision diamond 444, the processor 172 determines if there is a next address on the list to be processed. If not, the processor 172 terminates operation in step 448. If so, the processor 172 returns to step 420.

A number of variations and modifications of the invention can be used. It would be possible to provide for some features of the invention without providing others.

For example in one alternative embodiment, the principals of the subject invention are applied to text chat.

In another alternative embodiment, the various components are integrated into fewer components and/or are embodied as a logic circuit, such as Application Specific Integrated Circuit or ASIC, as software, or as a combination thereof.

In another alternative embodiment, the instant message script processor 172 or interactive instant messaging resource device 156 interacts with a customer when an instant message notification is received. This embodiment assumes that the contact center itself or an agent or another component of the contact center, maintains a "buddy" list of selected customers' instant messaging handles. The handles can be selected based upon predetermined criteria, such as customer status, quality, or category (e.g., gold, silver, or bronze), customer business level over a specified time period, recency of last customer (instant message) contact, interests of customer, and the like. The "buddy" list could be maintained, for example, as part of a campaign or alert.

The instant message notification received from the customer's instant messaging service 124 indicates that the customer is now available via the communication device 116 to receive instant messages. As noted previously in instant messaging, an entity (such as the customer) is notified when one of the entities on the customer's buddy list (the interaction center) is on line and the contact information of the on line entity is provided to the notified entity's communication device. When an entity's (or the customer's) communication device goes on line, the entity's contact information is also forwarded to the entities (the interaction center) on the buddy list that are signed on. To initiate a contact with an entity, an entity clicks on the name of an entity on the buddy or contact list that is shown as being on line and a window opens into which text can be entered. The entity can then send an inputted message to the selected entity by clicking on a send command. After receiving the instant message notification, the processor 172 performs steps 420, 432, 428, 436, and 440 of FIG. 4. The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

In another embodiment, the present invention is used with sessionless protocols other than instant messaging.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for interacting with a customer in an interaction center, comprising:
   maintaining, by a gateway, a list of blocked instant message handles of different customers such that, when a blocked instant message handle is received as part of an instant message by the gateway, the instant message is dropped by the gateway without being routed to an interaction center resource;
   receiving, by the gateway, an instant message notification from an instant messaging service associated with a customer that the customer is available to receive instant messages at a customer communication device before the customer attempts contacting the interaction center;
   in response to the instant message notification, forwarding, by the gateway, to the customer communication device an instant message containing an invitation to the customer to interact with the interaction center before the customer attempts contacting the interaction center; and
   providing, by a server, selected presence information to the customer communication device, wherein the selected presence information is determined by applying business rules that require different presence information to be provided to a selected customer for different interaction center states.

2. An interaction center, comprising:
   a gateway, and an interaction server comprising memory and a processor, where instructions are stored in the memory that, when executed by the processor, enable the interaction center to:
   maintain a list of blocked instant message handles of different customers such that, when a blocked instant message handle is received as part of an instant message by the gateway, the instant message is dropped by the interaction center without being routed to an interaction center resource;
   receive, an instant message notification from an instant messaging service associated with a customer that the customer is available to receive instant messages at a customer communication device; and
   in response to receiving the instant message notification, forward to the customer communication device an instant message containing an invitation to the customer to interact with the interaction center, wherein the instant message containing the invitation comprises presence information associated with an interaction center agent that is different from actual presence information for the agent, wherein the difference between presence information provided in the instant message and the actual presence information for the agent is based on at least one of an agent skill and a customer value, and wherein the invitation is sent in the absence of an attempt by the customer to contact the interaction center using an instant message.

3. A method, comprising: maintaining, by an interaction center gateway, a list of blocked instant message handles of different customers such that, when a blocked instant message handle is received as part of an instant message by the gateway, the instant message is dropped by the interaction center without being routed to an interaction center resource;
   receiving, by the gateway, an instant message comprising an instant message handle; determining whether the instant message is on the list of blocked instant message handles; and
   when the instant message is on the list of blocked instant message handles, not servicing the instant message by an interaction center resource.

4. The method of claim 3, further comprising: when the instant message is not on the list of blocked instant message handles, forwarding, by the gateway, to the customer communication device an instant message comprising selected presence information, wherein the selected presence information is determined by applying business rules that require different presence information to be provided to a selected customer for different interaction center states.

5. The method of claim 4, further comprising: initiating, for an instant message handle of the customer, a workflow for the instant message notification to determine an interaction center resource to perform the forwarding step, wherein, according to the business rules and for a first interaction center state, a higher value customer requiring a first skill receives different presence information than a lower value customer also requiring the first skill.

6. The method of claim 4, wherein the interaction center administers a plurality of instant message handles, wherein the interaction center has a first interaction center state, the first interaction center state including at least one of interaction center staffing level for a skill, interaction center staffing level for a queue, a queue length, a queue population, an actual wait time for service, and an estimated wait time for service, and further comprising:
   applying, by a workflow server, the business rules to the first interaction center state to determine pertinent presence information to be provided for each administered instant message handle;
   for each administered instant message handle, selecting, by the workflow server, from among a plurality of different predetermined presence information messages, wherein at least two of the administered instant message handles have different corresponding presence information messages for the first interaction center state.

7. The method of claim 4, wherein the business rules are based on at least one of the following attributes: customer value, skill requested, contact history, customer entitlement, customer language, and customer preference.

* * * * *